April 9, 1968 J. W. CORCORAN 3,377,556
SHAFT SPEED DETECTOR WITH VARIABLE CAPACITIVE
COUPLING BETWEEN THE SHAFT AND AN
ELECTRICAL SIGNAL GENERATOR
Original Filed May 14, 1964  2 Sheets-Sheet 1

INVENTOR.
JOHN W. CORCORAN
BY
*Fryer + Tjensvold*
ATTORNEYS

April 9, 1968
J. W. CORCORAN
3,377,556
SHAFT SPEED DETECTOR WITH VARIABLE CAPACITIVE
COUPLING BETWEEN THE SHAFT AND AN
ELECTRICAL SIGNAL GENERATOR
Original Filed May 14, 1964
2 Sheets-Sheet 2
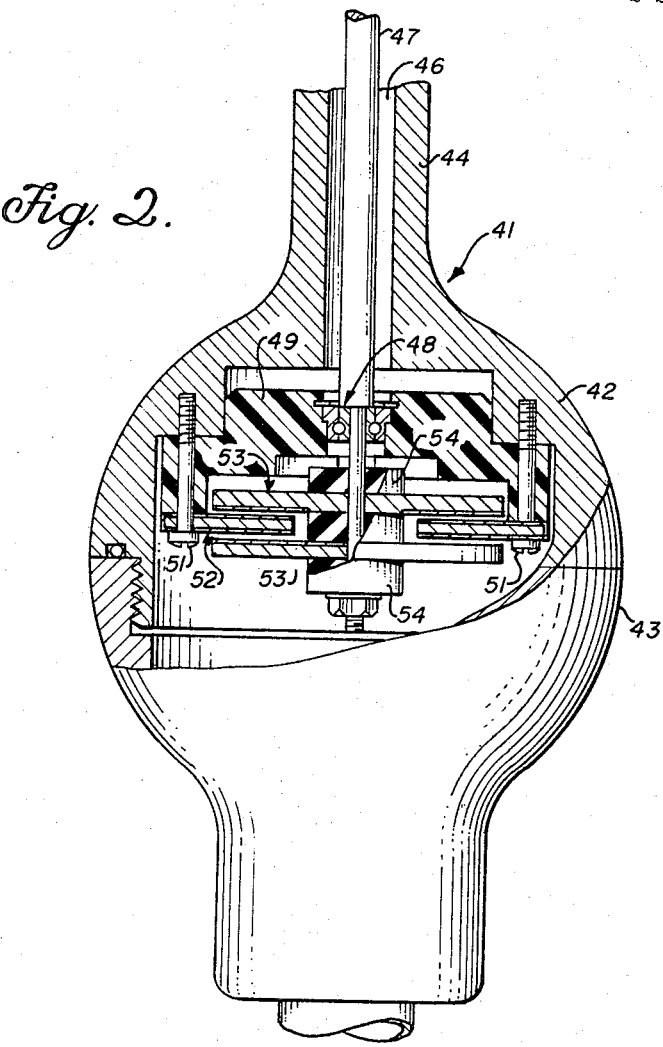
Fig. 2.
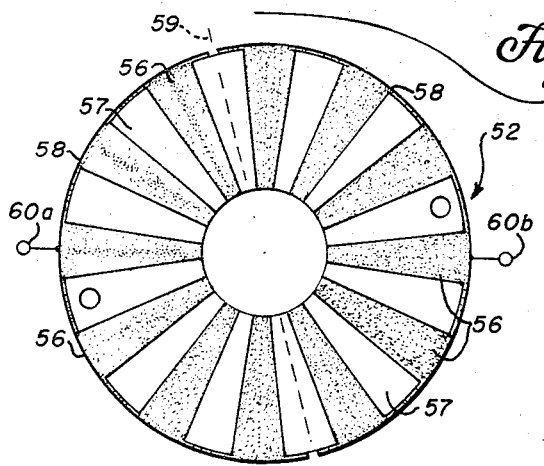
Fig. 3.
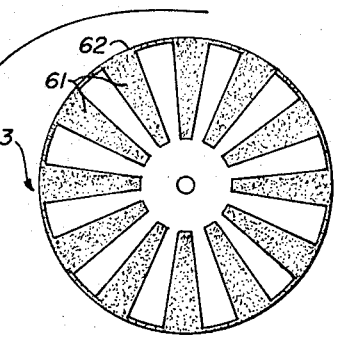
INVENTOR.
JOHN W. CORCORAN
BY
Fryer + Tjensvold
ATTORNEYS United States Patent Office 3,377,556
Patented Apr. 9, 1968

3,377,556
SHAFT SPEED DETECTOR WITH VARIABLE CAPACITIVE COUPLING BETWEEN THE SHAFT AND AN ELECTRICAL SIGNAL GENERATOR
John W. Corcoran, Redwood City, Calif., assignor to Beckman & Whitley, Inc., San Carlos, Calif., a corporation of Delaware
Continuation of application Ser. No. 367,372, May 14, 1964. This application Jan. 30, 1967, Ser. No. 612,735
2 Claims. (Cl. 324—70)

ABSTRACT OF THE DISCLOSURE

Capacitive elements in the form of radial bands on a disc are carried on a shaft for rotation therewith and interact with adjacent stationary capacitive elements to form a capacitance which varies cyclically as function of the rotary speed of the shaft. The variable capacitance is coupled to an electrical signal generator to modulate the output signal therefrom whereby the signal is indicative of the shaft speed.

Cross-reference to related application

This application is a continuation of prior co-pending application of John W. Corcoran Ser. No. 367,372 filed May 14, 1964, now abandoned, for Device for Producing an Electrical Signal Which is a Function of the Speed of the Shaft.

The present invention relates to wind speed measuring instrumentation and more particularly to an anemometer which is associated with an electronic circuit through a capacitor transducer.

The scientific field of meteorology plays a very important role in many scientific endeavors such as space exploration, nuclear energy research, etc., and supplies a very practical service in connection with commercial and military air travel, along with many other fields. And while the meteorologist—the weather man—is by no means a newcomer to the scientific scene, his role today is more far reaching and more complex than ever imagined possible a few decades ago. With the aid of electrical communications and high speed computers meteorologists are able to gather large quantities of data from remote sampling stations. This information is useful to inform the meteorologist of what the prevailing weather conditions are so that he may better predict what subsequent weather conditions may be.

While the advance of science has brought to the meteorologist many new tools, such as telemetering equipment and high speed computers, some of his most basic tools such as anemometers and wind vanes have failed to keep pace with increasing needs for accuracy and reliability. As a consequence, the meteorologist often finds that his basic source of information is unreliable as compared to the equipment which he employs to gather and analyze this information.

In order for a meteorological instrument such as an anemometer to be reliable it must be capable of long term operation without failure caused by component wear, and it must be capable of maintaining its accuracy over this same term. The importance of these characteristics is due to the use of weather sensing apparatus in physically remote locations which are in communication with the observer by long cables or other electrical communication means. When one considers the amount of data which is lost during the time it takes to reach and service an anemometer at such a location, the importance of reliability becomes quite clear.

Anemometers which are most popularly employed in the field are those which are characterized by a plurality of cup shaped members affixed to a rotatably mounted shaft. The cup shaped members are driven by the wind causing the shaft to rotate at a speed which is proportional to the wind speed. One of the most difficult problems associated with anemometers of this type resides in transducing the speed of the rotating shaft into an electrical signal without imposing a load on the shaft which prevents its rotational speed from being proportional to the wind speed. One means used for transducing the rotational speed of an anemometer shaft into an electrical signal is to connect the rotating shaft to the wiper arm of a potentiometer causing the resistance of the potentiometer to vary at a speed proportional to the speed of the anemometer shaft. This means of transducing the anemometer shaft speed into an electrical signal is hampered by the fact that the potentiometer includes a wiper arm which must make physical contact with the resistance element. The constant sliding motion between the arm and the resistance element causes a measurable amount of drag to be placed on the anemometer shaft which results in inaccuracies of the anemometers measuring ability at low wind speeds. The contact within the potentiometer further has the disadvantage that it causes wear between the slide and the resistance element which can change the value of the resistance or induce a complete discontinuity, totally disabling the measuring apparatus.

The present invention provides, for the first time, a means by which the shaft speed of an anemometer can be transduced into an electrical signal without requiring any physical contact between the rotating shaft and the components of the electronic instrumentation generating the electrical signal. In devising a transducer having this single characteristic of non-contact, the present invention eliminates all frictional drag on the anemometer shaft other than that caused by the shaft support bearing, and further eliminates component wear due to relative motion between contacting members.

Accordingly, it is an object of the present invention to provide means for transducing the speed of a rotating shaft into an electrical signal wherein the transducer adds no frictional drag to the rotating shaft.

It is a further object of the present invention to provide wind speed measuring instrumentation including an anemometer which is coupled to an electronic circuit through a capacitor transducer such that the rotational speed of the anemometer shaft is transduced into an electrical signal without any frictional contact between the relative moving parts of the transducer means.

It is yet another object of the present invention to provide an improved variable capacitor.

Further and more specific objects and advantages of the present invention will be made apparent in the following specification wherein a preferred form of the invention is described by reference to the accompanying drawings.

In the drawings:

FIG. 2 is a cross sectional illustration of the capacitor transducer, the anemometer shaft, and complementary housing structure; and FIG. 3 is a plan view of the capacitor plates of the capacitor transducer.

Figure 1:
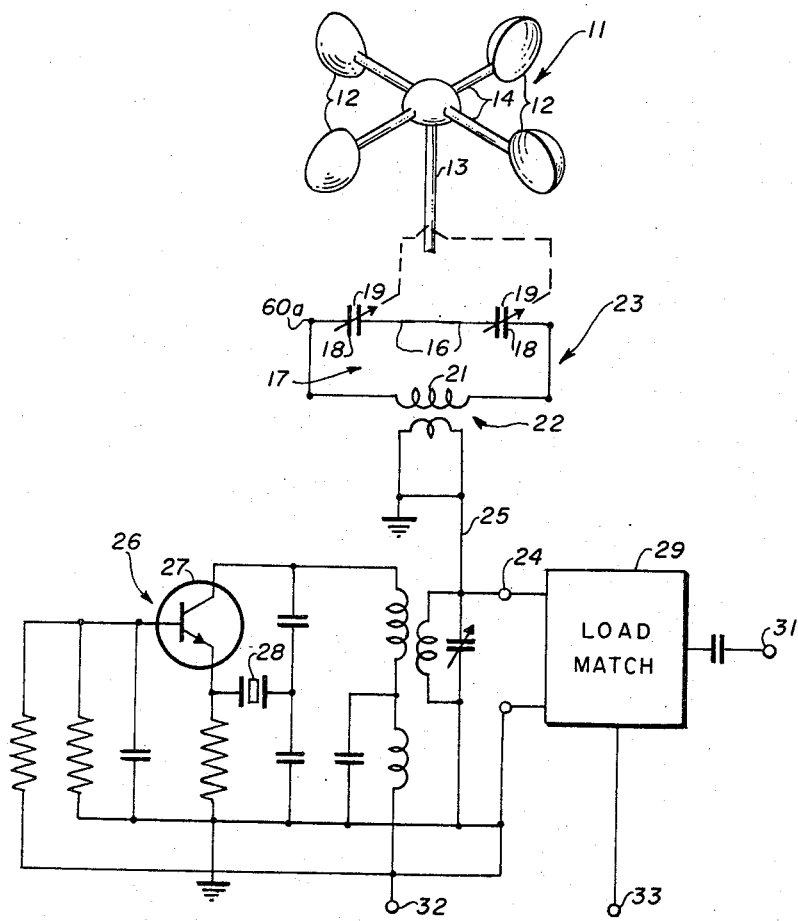
FIG. 1 is an electrical schematic diagram illustrating the electronic components of the present invention.

Referring now to FIG. 1, an anemometer 11 includes a plurality of cup shaped members 12 which are connected to a rotatably mounted shaft 13 by means of connecting arms 14. Also connected to shaft 13 is the rotor 16 of a capacitor transducer 17. The stator 18 of the transducer 17 is electrically split so as to combine with the rotor 16 to effectively form two series connected variable capacitors 19. As the shaft 13 rotates and the rotor 16 moves relative to stators 18 the value of the capacitance of capacitors 19 varies cyclically between a maximum and a minimum, as will be described in greater detail below. Capacitors 19 are electrically connected in parallel with an inductor 21 which forms one winding of a transformer 22. The capacitors 19 and inductor 21 form a tank circuit, the resonant frequency of which varies with changes in the value of the capacitance of capacitors 19. This tank circuit 23 is coupled through the transformer 22 to the output 24 of an oscillator circuit 26 by means of conductor 25. The oscillator circuit 26 is of conventional and well known design and includes a transistor 27 and a piezoelectric crystal 28 together with various resistors, capacitors and inductors which are arranged to form a Colpitts-type oscillator (this oscillator is sometimes referred to as a Clapp-type oscillator). While oscillators of various design are satisfactory for use in the present invention, the Colpitts oscillator which is illustrated has been selected for its outstanding characteristic of stable and predictable frequency output. The output 24 of the oscillator 26 is connected to a load matching network 29, the output 31 of which can be connected directly to a data receiving instrument or to a transmission line over which the desired information is transmitted to a data receiving instrument. The load matching network 29 (which can be one of any well known designs, e.g. an emitter follower circuit) isolates the oscillator 26 from the effect of line capacitance and other disturbances.

In operation the oscillator and load matching networks are energized by applying suitable sources of electrical energy to terminals 32 and 33 whereby a fixed frequency signal is generated by the oscillator and made available at the ultimate output terminal 31. By loading the output 24 of the oscillator 26 with the tank circuit 23, the current through the transistor 27 is increased and decreased as the value of capacitors 19 changes. These variations in current through transistor 27 result in the signal at the output 24 varying in magnitude at a rate proportional to the speed of the rotor 16. Thus, the desired information is achieved by measuring the frequency of the changes in magnitude of the fixed frequency signal provided by the oscillator 26.

It is to be noted that none of the components which form the oscillator 26 are employed as part of the transducing circuit 23. In this manner the outstanding frequency characteristics of the Colpitts oscillator employed are not compromised and the full benefits of a stable oscillator are enjoyed. At the same time, however, the rotational speed of the rotor 16 (and thus the anemometer shaft 13) is effectively transduced into an electrical quantity which is imposed on the oscillator signal. By virtue of these outstanding characteristics the present invention provides a wind speed measuring device having the requisite reliability to more fully meet the stringent needs presently required in the meteorological field than other instruments now known in the art.

Referring now to FIGS. 2 and 3, a spherical housing 41 includes an upper housing member 42 which is threadably secured to lower housing member 43. The two housing members are separable to provide access to the interior of the housing. Integral with the upper housing 42 is a generally cylindrical extension 44 having a central bore 46 which opens into the interior of housing 41. Extending through the bore 46 is the rotatable anemometer shaft 47 which extends into the interior of housing 41 and is supported therein by a bearing 48 which is secured in place by a bracket 49. The bracket 49 is secured to the upper housing member 42 by means of screws 51 which also serve to secure the capacitor transducer stator plate 52 to the bracket 49 and thus within the housing 41. The portion of shaft 47 which extends through bearing 48 is of a reduced diameter and has mounted thereon a pair of capacitor plates 53 which form the rotor 16 of the capacitor transducer. The plates 53 are disposed on either side of stator plate 52 and are maintained in this relative position by means of spacer members 54. The reduced diameter portion of shaft 47 extends through the central opening in stator 52 such that an annular portion of each plate 53 is in facing relation to an annular portion of stator plate 52.

When the shaft 47 rotates as a result of wind acting on cup shaped members 12, the rotor plates 53 are rotated and move relative to the stator plate 52.

The stator plate 52 is formed from a non-electrically conductive material, such as a laminated plastic, and has deposited on at least one face thereof a plurality of radially extending bands 56 of electrically conductive material, such as copper. Each of the bands 56 is separated from an adjacent band by an area 57 which is essentially free of electrically conductive material. As mentioned above, the stator is electrically split. This is physically realized by having approximately one-half of the bands on disc 52 electrically connected together, as by thin deposits of copper 58 along the circumference of the disc, while the remaining bands 56 are similarly put into electrical contact with one another. In FIG. 3 a dotted line 59 suggests a possible dividing line for the stator 52 across which no electrical continuity exists via electrically conductive material placed on the disc 52. Terminals 60a and 60b each connect electrically to one side of line 59. Thus, a capacitor is formed between terminal 60a and rotor 53, and another serially connected capacitor is formed between rotor 53 and terminal 60b. By connecting the circuit 23 to terminals 60a and 60b the need for brushes or other moving contacts is completely eliminated.

Rotor discs 53 are formed of non-conductive material such as laminated plastic and have disposed thereon radially extending bands 61 of electrically conductive material such as copper. Unlike the stator 52 the rotor discs 53 are not split and all of the bands 61 are electrically connected to the other bands as by a thin deposit 62 of electrically conductive material along the circumference of the discs 53.

The embodiment as shown in FIG. 2 illustrates the capacitor transducer as including a single stator disc 52 and a pair of rotor discs 53. In such an embodiment the stator disc 52 has conducting bands 56 deposited on both of its surfaces with the bands of one surface being arranged in an identical pattern with that of the other surface. Also the bands on one surface which electrically connect to one another also connect with the immediately opposing bands on the opposite surface. In this manner there are still only two electrically separate portions to the stator, as there are when only a single face of the stator has conductive bands deposited thereon. When a two rotor plate embodiment is employed, rotor plates 53 have identical band configurations and are secured to the shaft 47 so as to have their bands 61 in angular alignment with one another. The bands 61 of rotor plates 53 are so arranged with respect to the bands 56 of stator plate 52 that when the rotor and stator are operatively disposed there will be at least one angular position of the rotor where all of the bands 61 will angularly align with bands 56, and another position where the bands of the rotor will be angularly aligned with the spaces between bands of the stator. It follows that when the bands 61 are in angular alignment with the bands 56 the value of the capacitance formed by the opposing plates will be at a maximum while when the bands 61 are aligned with the spaces 57 the value of the capacitance will be at a minimum. As the rotor plate or plates (depending on the choice of embodiments) rotate the capacitance value of the capacitor transducer will vary between the maximum and minimum. The number of complete excursions from a maximum to a minimum is determined by the number of bands 56 deposited on the plates of the capacitor. Thus, without forming any mechanical connection between the shaft 47 and the electronic circuits 23 and 26 the speed of the shaft 47 is accurately transduced into an electrical quantity which can be conveniently transmitted over a transmission line to a central data receiving station.

One of the features of the present invention which enables all mechanical connections other than bearing 48 to be eliminated is the split stator design as illustrated in FIG. 3. Since half of the electrically conductive bands 56 of plate 52 are electrically isolated from the other half of the bands, plate 52 is in effect two separate capacitor plates each of which shares a common rotating plate 53. As shown in the schematic illustration of FIG. 1 this in effect provides two capacitors in series which for the purpose of this invention function the same as a single capacitor. By spliting the stator the necessity of forming an electrical contact between the rotor 53 and some stationary terminal which connects with the circuit 26 is completely eliminated thereby eliminating the necessity for a friction coupling member. It is to be noted that this advantage is present whether the embodiment employed includes a single rotor plate 53 which combines with a stator having only one face with electrically conductive bands deposited thereon or a two rotor system as described above (the use of two rotor plates increases the magnitude of the output signal desired).

Thus, the present invention provides a rotating anemometer wherein the only friction producing element is a single support bearing necessary for mounting the anemometer shaft. The invention provides a device for measuring rotational speed of a shaft wherein the reliability of the device is not limited by the relatively short life of two members in frictional contact.

What is claimed is:
1. In a device for producing an electrical signal which is a function of the rotation speed of a shaft driven by a low torque input, the combination comprising:

a capacitive rotor plate carried on said shaft for rotation therewith, the rotor plate being a generally circular disc of non-conductive material with a plurality of spaced apart radial bands of conductive materials disposed thereon, said bands being electrically connected with one another only at their outer periphery;

a capacitive stator plate disposed adjacent said rotor plate in spaced relation therefrom and forming a variable capacitance in conjunction therewith, the capacity of which varies cyclically at a rate which is a function of said rotational speed of said shaft, the stator plate being a disc of non-conductive material which is coaxially disposed at a close non-contacting location with respect to said rotor plate, said stator plate having a plurality of spaced apart radial bands of conducting material disposed thereon, wherein approximately one-half of the bands on said stator plate are connected by first conductive means on the stator plate, the other bands on the stator plate being connected by second conductive means on the stator plate the stator plate forming with the rotor plate a pair of series connected variable capacitors, the capacitance of which vary as the shaft rotates; and an electrical signal generator having an output coupled to said variable capacitance for producing a signal which is modulated by variations in said capacitance, said modulation having a frequency proportional to the rotation speed of said shaft whereby measurement of said modulation frequency produces an indication of shaft rotation speed.

2. The device of claim 1 wherein the bands on said rotor plate are in facing relation to the bands on said stator plate, and in at least one angular position of said rotor plate the bands of said rotor plate are in the same angular position as the bands of said stator plate while in at least one angular position of said rotor plate the angular position of the spaces between the bands on said rotor plate is the same as the angular position of the bands on said stator plate.

References Cited
UNITED STATES PATENTS

| 1,600,842 | 9/1926  | Philips      | 317—250 |
| 2,455,345 | 11/1948 | Watt         | 324—70  |
| 2,548,790 | 4/1951  | Higginbotham | 340—200 |
| 2,674,729 | 4/1954  | Carter       | 340—200 |
| 3,121,839 | 2/1964  | Malenick     | 340—200 |
| 3,146,394 | 8/1964  | Frisch       | 340—200 |
| 3,296,522 | 1/1967  | Wolfendale   | 340—200 |

FOREIGN PATENTS

| 533,061 | 11/1954 | Belgium.     |
| 326,602 | 12/1957 | Switzerland. |

RUDOLPH V. ROLINEC, *Primary Examiner.*

M. LYNCH, *Assistant Examiner.*